(12) United States Patent
Goncze

(10) Patent No.: US 9,235,220 B2
(45) Date of Patent: Jan. 12, 2016

(54) THERMOSTATIC MIXING VALVE UNIT

(75) Inventor: Zoltan Goncze, Reno, NV (US)

(73) Assignee: Haws Corporation, Sparks, NV (US)

( * ) Notice: Subject to any disclaimer, the term of this patent is extended or adjusted under 35 U.S.C. 154(b) by 893 days.

(21) Appl. No.: 13/281,788

(22) Filed: Oct. 26, 2011

(65) Prior Publication Data

US 2012/0104107 A1    May 3, 2012

Related U.S. Application Data

(60) Provisional application No. 61/407,254, filed on Oct. 27, 2010.

(51) Int. Cl.
G05D 23/13    (2006.01)
G05D 23/12    (2006.01)
F24C 3/12     (2006.01)

(52) U.S. Cl.
CPC .................................. G05D 23/1346 (2013.01)

(58) Field of Classification Search
CPC .................................................. G05D 23/1346
USPC ........................ 236/92 R, 12.11, 12.13, 12.15
See application file for complete search history.

(56) References Cited

U.S. PATENT DOCUMENTS

| | | | | |
|---|---|---|---|---|
| 3,001,717 A * | 9/1961 | Rimsha et al. | ............. | 236/12.13 |
| 4,867,375 A * | 9/1989 | Ueki et al. | ................. | 236/12.12 |
| 5,350,112 A * | 9/1994 | Stein | ........................... | 236/12.13 |
| 5,379,936 A * | 1/1995 | Kline | ............................ | 236/12.2 |
| 6,050,285 A * | 4/2000 | Goncze et al. | .................. | 137/98 |
| 6,119,947 A * | 9/2000 | Couture et al. | ............ | 236/12.11 |
| 6,575,377 B1 * | 6/2003 | Graves | ........................ | 236/12.2 |
| 7,913,926 B2 | 3/2011 | Goncze | | |
| 2005/0116053 A1 * | 6/2005 | Goncze et al. | ............. | 236/12.11 |
| 2005/0127193 A1 * | 6/2005 | Taylor et al. | ............... | 236/12.15 |
| 2006/0231637 A1 * | 10/2006 | Schmitt | ....................... | 236/12.11 |
| 2007/0221740 A1 * | 9/2007 | Beck et al. | ................. | 236/12.11 |
| 2009/0200388 A1 * | 8/2009 | Jarvis | .......................... | 236/12.13 |
| 2012/0167999 A1 * | 7/2012 | Lo et al. | .......................... | 137/98 |
| 2012/0325918 A1 * | 12/2012 | Kempf et al. | .............. | 236/12.13 |
| 2013/0098474 A1 * | 4/2013 | Tung | ............................... | 137/98 |

* cited by examiner

Primary Examiner — M. Alexandra Elve
Assistant Examiner — Henry Crenshaw
(74) Attorney, Agent, or Firm — Lowry Blixseth LLP; Scott M. Lowry

(57) ABSTRACT

A thermostatic mixing valve unit in an emergency wash unit has an integrated housing with cold and hot water inlets each having an associated check valve, and a tempered water discharge having a thermostat for cold/hot water mixing to provide a predetermined tempered water discharge. A high temperature limit valve responds to the water discharge temperature to permit or prevent hot water inflow when the water discharge exceeds a preset temperature. A cold water bypass valve is coupled by a diverter valve to the lower of the cold and hot water supply pressures to maintain a substantial water discharge flow when the high temperature limit valve restricts hot water flow or when the hot water check valve is stuck closed, or upon failure of the cold water supply as by sticking of the cold water check valve in a closed position or by a clogged filter screen.

20 Claims, 14 Drawing Sheets

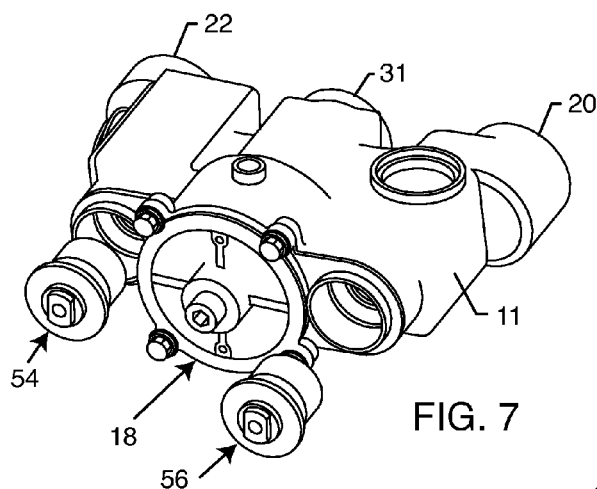
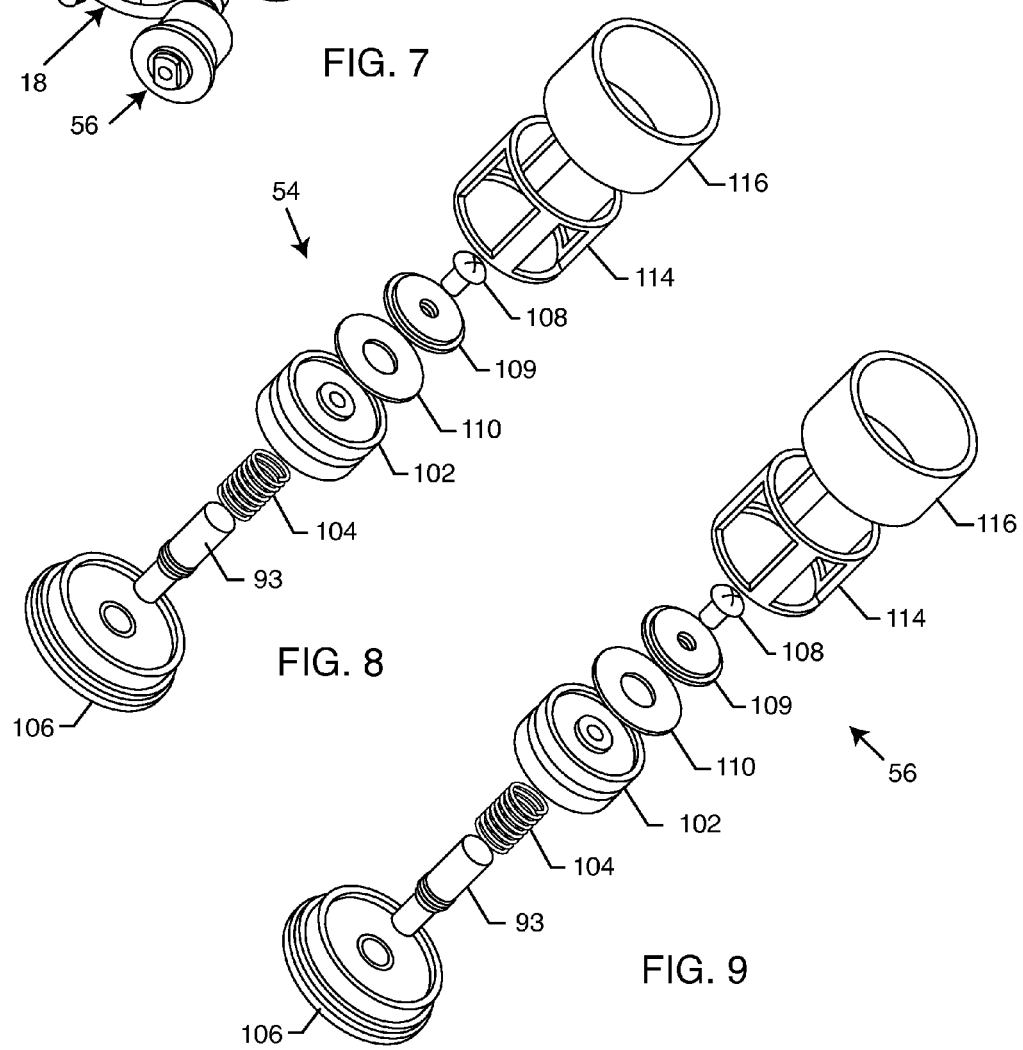

THERMOSTATIC MIXING VALVE UNIT

BACKGROUND OF THE INVENTION

This invention relates generally to improvements in thermostatic mixing valve units and systems of the type generally shown and described in U.S. Pat. No. 5,350,112, for use with an emergency wash station, such as an eyewash station and/or a shower station. More specifically, this invention relates to an improved thermostatic mixing valve unit of substantially unitary or integrated construction having an internal high temperature limit valve for restricting hot water inflow upon a tempered water discharge exceeding a predetermined temperature level, in combination with a diverter valve for operating a cold water bypass valve to provide a substantial water discharge flow upon hot water restriction and/or failure of various system components.

Thermostatic mixing valves and related systems are generally known in the art for use in emergency wash stations such as eyewash and/or shower stations designed to provide a tempered water discharge outflow at a selected, and relatively lukewarm or tepid temperature level to flush contaminants such as hazardous chemicals and the like from a person's eyes, skin and clothing. A common system uses a thermostatic mixing valve for connection to cold and hot water supplies, and includes means for thermostatically and automatically blending or mixing these water inflows to produce a discharge outflow having the selected, tempered temperature.

In the past, tempered water mixing systems have on occasion encountered malfunction in the operation of the thermostatic mixing valve. Such malfunction can occur in any one of several different modes. As one example, the mixing valve can stick in a position providing unregulated water flow, wherein too much hot water can result in potential scalding of a person using the emergency wash station. In another failure mode, either one of a pair of hot and cold water check valves can stick in a closed position thereby preventing flow of hot or cold water to the mixing valve and resultant unregulated water temperature at the discharge outflow.

Some tempered water mixing systems have been designed with back-up features intended to address at least some of these potential failure modes. For example, solenoid operated valves have been used in combination with various temperature switches and/or flow rate switches to bypass cold water around the main mixing valve when a hot water malfunction occurs. Such devices rely, however, upon electrical power to achieve proper back-up operation. In the event of a power failure, the back-up devices have generally failed to function, or otherwise have provided for only cold water flow. In addition, during normal operation, the electrically operated components can cycle back-and-forth, so that a user is subjected to alternating brief flows of water that are either too hot or too cold. Further, electrically powered back-up devices are unsuitable for many industrial applications wherein the emergency wash station must be located in close proximity to volatile materials.

U.S. Pat. No. 5,350,112 discloses an improved tempered water mixing system wherein a high temperature limit thermostat is installed within the tempered water discharge outflow, and responds to detection of a tempered water temperature exceeding a predetermined limit by restricting hot water inflow to the main mixing valve. In addition, a cold water bypass valve responds to the pressure differential between a cold water inlet and the discharge outflow for bypassing cold water around the main mixing valve to maintain a substantial discharge outflow upon restriction and/or failure of the hot water inflow to the main mixing valve. However, this system as shown and described in U.S. Pat. No. 5,350,112 does not account for failure of the cold water inflow to the main mixing valve, as can occur upon sticking of a cold water check valve in a closed position.

There exists, therefore, a significant need for further improvements in and to thermostatic mixing valve units and systems of the type designed to provided a tempered water discharge outflow to an emergency wash station, such as to an eyewash station or the like. More particularly, there exists a need for a further improved thermostatic mixing valve unit designed to bypass cold water around a main mixing valve upon restriction and/or failure of either one of the cold and/or hot water supplies to the main mixing valve. The present invention fulfills this need and provides further related advantages.

SUMMARY OF THE INVENTION

In accordance with the invention, an improved thermostatic mixing valve unit is provided for use in an emergency wash station, such as an eyewash station and/or a drench-type shower station. The improved thermostatic valve unit comprises a substantially unitary or integrated housing having a cold water inlet with an associated cold water check valve, a hot water inlet with an associated check valve, and a tempered water discharge outlet. A thermostatic mixing valve includes a thermostat for mixing the cold and hot water inflows to provide a predetermined tempered water discharge at a selected discharge temperature.

A high temperature limit valve is mounted on the housing and responds to the actual water discharge temperature to modulate and/or shut off hot water inflow to the mixing valve when the water discharge temperature exceeds a predetermined level.

A cold water bypass valve is also mounted on the housing for bypassing cold water flow around the mixing valve for maintaining a desired water discharge temperature and/or flow. This cold water bypass valve is associated with a diverter valve which functions to couple the lower of the cold and hot water supply pressures to one side of the cold water bypass valve, whereby the bypass valve is responsive to restriction and/or failure of the hot water supply, or is alternately responsive to cold water supply failure as by sticking of the cold water check valve or a clogged cold water filter screen.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings:

FIG. 7 is a perspective view similar to FIG. 2, but depicting hot and cold water check valves in exploded relation;

FIG. 8 is an exploded perspective view of the hot water check valve shown in FIG. 7;

FIG. 9 is an exploded perspective view of the cold water check valve shown in FIG. 7;

DETAILED DESCRIPTION OF THE PREFERRED EMBODIMENTS

Figure 1:
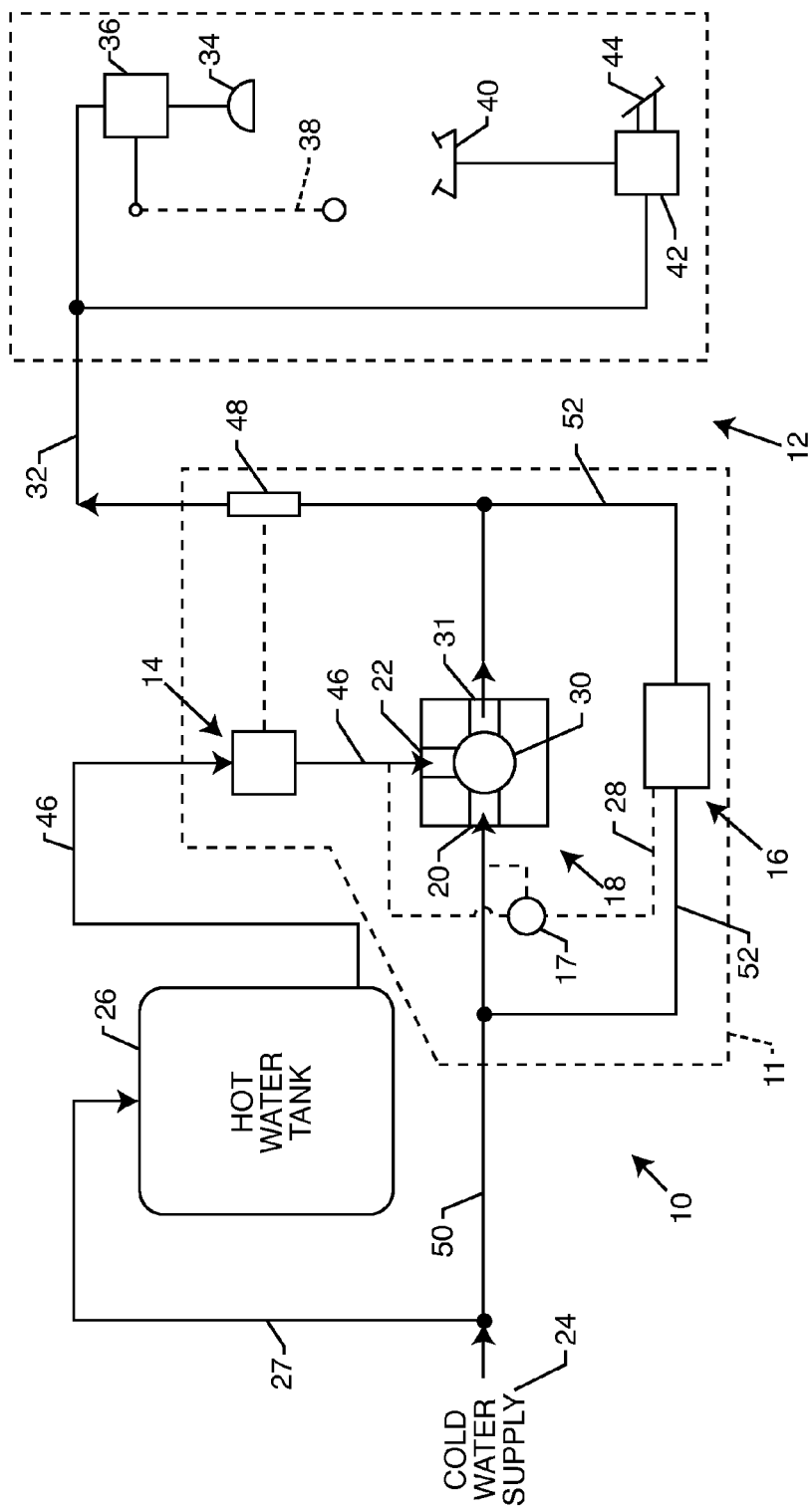
FIG. 1 is a schematic diagram illustrating a thermostatic mixing valve unit of the present invention in a combined emergency eyewash and emergency shower station.

As shown in the exemplary drawings, an improved thermostatic mixing valve unit referred to generally in FIG. 1 by the reference numeral 10 is provided for use with an emergency wash station 12 such as the illustrative eyewash station and/or a drench-type shower station for flushing contaminants from a person's eyes, skin and clothing. The thermostatic mixing valve unit 10 comprises a substantially unitized or integrated housing 11 including a thermostatic mixing valve 18 having a cold water supply inlet 20, and a hot water supply inlet 22 for respectively receiving cold and hot water inflows. A thermostatic valve element (referred to schematically in FIG. 1 by the reference numeral 30) operates the mixing valve 18 to provide a tempered water outflow via an outflow port 31. A high temperature limit valve 14 includes a thermostatic element 48 mounted within the tempered water outflow for modulating or preventing hot water inflow to the mixing valve 18 in a manner to maintain a desired tempered outflow temperature. In addition, a cold water bypass valve 16 responds to a diverter valve 17 for bypassing cold water flow around the mixing valve 18 during certain failure modes.

The tempered water mixing system including the improved thermostatic mixing valve unit 10 of the present invention is particularly designed for use in providing a tempered or relatively lukewarm water outflow at the discharge port 31 for flow through a discharge conduit 32 or the like to the emergency wash station 12, which, as shown, includes a combination of a lower eyewash station and an upper shower station. However, persons skilled in the art will recognize and appreciate that the invention may be used to supply tempered water to an emergency wash station including only an eyewash station, or only a shower station, or to other types of equipment such as various industrial process applications, etc. The mixing valve unit 10 is designed to provide a substantially failsafe discharge water outflow at the desired or selected relatively lukewarm temperature level, without significant risk of a failure mode wherein excessive quantities of hot water are inadvertently delivered. Moreover, the system is designed to establish a priority with respect to temperature and flow rate, in a manner insuring a substantial and selected minimum flow rate at virtually all times.

The thermostatic mixing valve 18 of the present invention has the cold water inlet 20 coupled as by means of a flow conduit 50 to a suitable source or supply 24 of cold or tap water. A hot water tank 26 includes an inflow conduit 27 coupled to the water source 24, wherein this tank 26 includes means (not shown) to heat the water to a selected and relatively high temperature level (typically on the order of about 120° F., or higher) for delivery via a hot water conduit 46 through the high temperature limit valve 14 to the hot water inlet 22 of the mixing valve 18. The mixing valve 18 functions in response to a preferably adjustable setting of the thermostatic valve element 30 (FIG. 1) to mix or blend the cold and hot water inflows in a selected proportion, and to deliver the resultant tempered discharge outflow via the outlet 31 and the conduit 32 to the emergency wash station 12. As shown schematically in FIG. 1, the exemplary wash station 12 comprises an upper drench-type shower head 34 equipped with a shut-off valve 36 which can be opened as by means of an easily accessible pull cord 38. The outflow conduit 32 may also be coupled to a lower eyewash station including an eyewash head 40, a shut-off valve 42, and an easily accessible means for rapid opening of the valve 42, such as by means of a foot switch 44 or other suitable switch device.

In accordance with the invention, the thermostatic mixing valve unit 10 comprises the substantially integrated housing 11 (FIGS. 1-4) including the high temperature limit valve 14 with thermostatic element 48 mounted thereon, in addition to the cold water bypass valve 16 mounted thereon for controlled bypass of cold water around the mixing valve 18 via a bypass flow path 52. Importantly, this cold water bypass valve 16 is coupled to and controlled by the diverter valve 17 which is also mounted onto or within the housing 11 (see FIGS. 12-14 and 16). In general, this diverter valve 17 couples the lower of the hot and cold water supply pressures to the bypass valve 16 to insure a minimum and substantial water flow rate through the conduit 32 (FIG. 1) to the wash station 12. This minimum and substantial water flow rate thus accounts for multiple potential failure modes of the unit 10, while prioritizing flow rate over temperature to insure the availability of flush water in an emergency situation.

Figure 2:
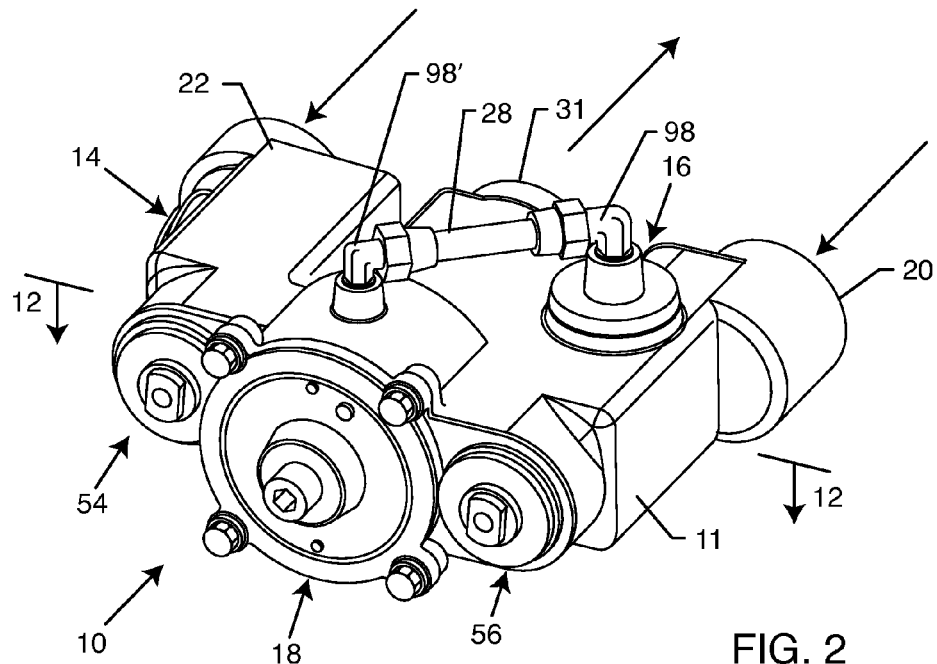
FIG. 2 is a perspective view showing the thermostatic mixing valve unit of the present invention.
Figure 3:
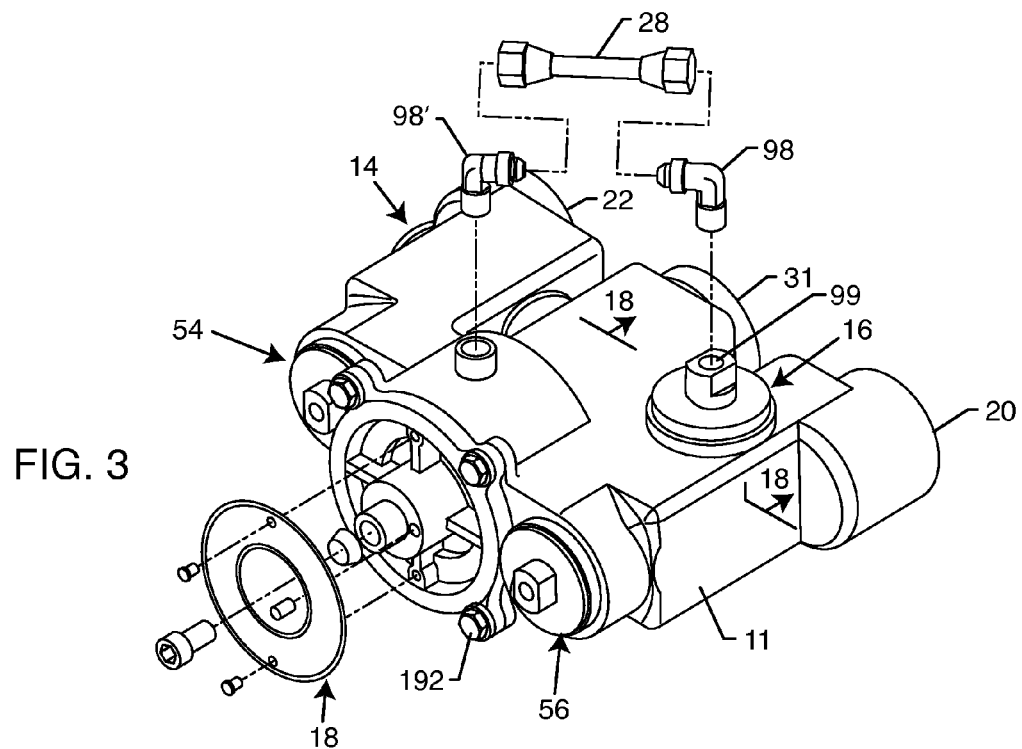
FIG. 3 is a somewhat enlarged perspective view of the thermostatic mixing valve unit of FIG. 2, with selected components illustrated in exploded relation.
Figure 4:
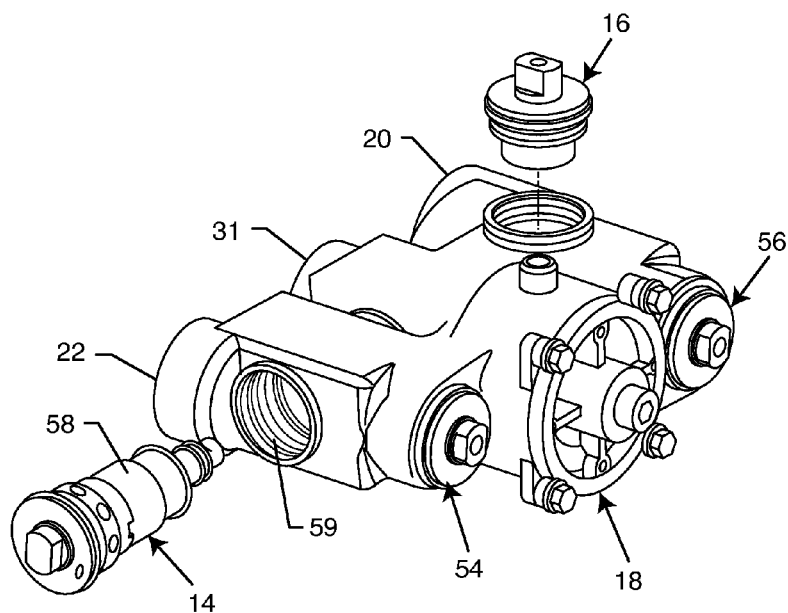
FIG. 4 is a perspective view similar to FIG. 2, but showing the thermostatic mixing valve unit from another angle and illustrating a cold water bypass valve and a high temperature limit valve in exploded relation.

FIGS. 2-4 illustrate the thermostatic mixing valve unit 10 of the present invention in one preferred form to include the substantially one-piece or unitized housing 11. As shown, this housing 11 includes the cold and hot water inlets 20 and 22 flanking the central tempered water discharge outlet 31. The high temperature limit valve 14 is installed within the hot water inlet 22 (FIG. 4) of the housing 11, with the associated thermostatic element 48 extending laterally into the adjoining tempered water discharge outlet 31, as viewed best in FIGS. 12-13. Similarly, the cold water bypass valve 16 is installed on the housing 11 at the cold water inlet 20, and is coupled via a short length of tubing 28 (FIGS. 2-3) to the diverter valve 17 (shown best in FIGS. 12-13).

The housing 11 also carries and supports a hot water check valve 54 (FIGS. 2-4 and 7-8) mounted thereon generally at a downstream location relative to the high temperature limit valve 14, and a cold water check valve 56 (FIGS. 2-4, 7 and 9) mounted thereon at a downstream location relative to the cold water bypass valve 16. These check valves 54 and 56 beneficially prevent backflow within the housing 11 and the related plumbing network. FIGS. 2-4 and 7 show these hot and cold water check valves 54, 56 mounted onto the housing 11 generally at a front end thereof, in respective opposition to the associated hot and cold water inflow ports 22 and 20, and in flanking relation to the thermostatic mixing valve 18 which is centrally mounted onto the housing 11 at a position generally between the check valves 54, 56.

Figure 6:
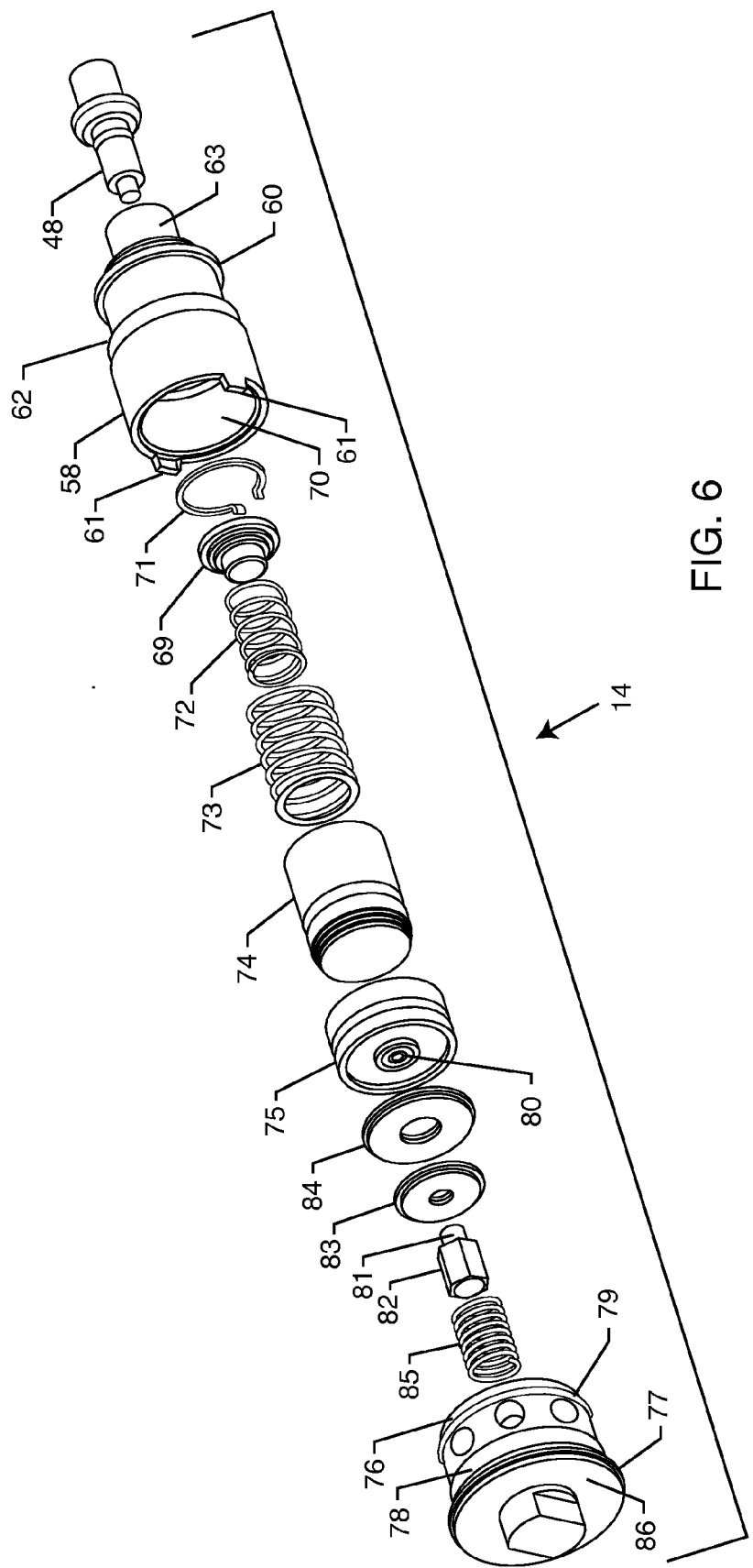
FIG. 6 is an exploded perspective view of the high temperature limit valve of FIG. 4.
Figure 12:
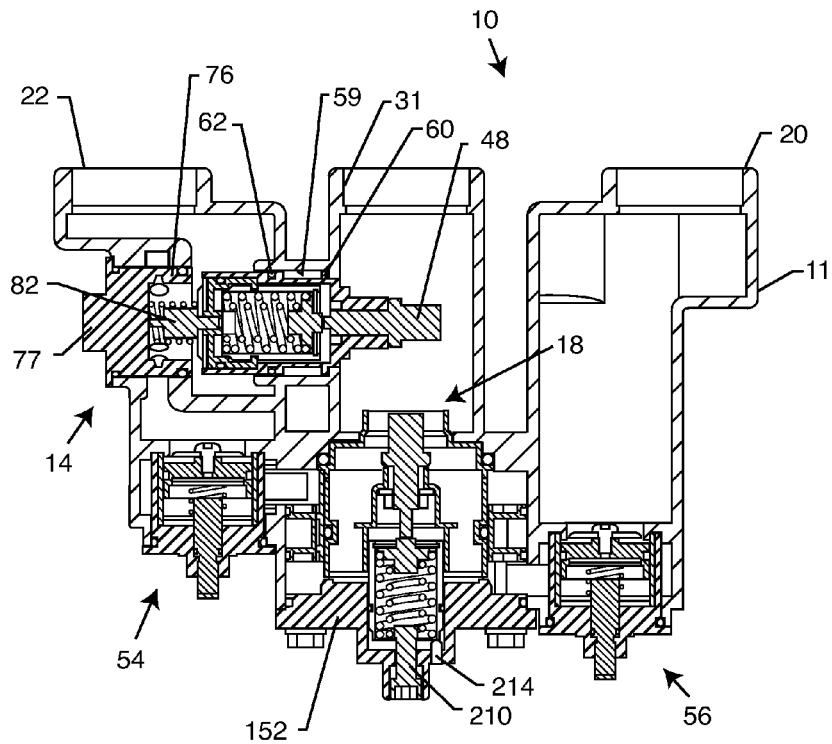
FIG. 12 is a horizontal sectional view taken generally on the line 12-12 of FIG. 2, and depicting the thermostatic mixing valve unit in a no-flow condition.
Figure 13:
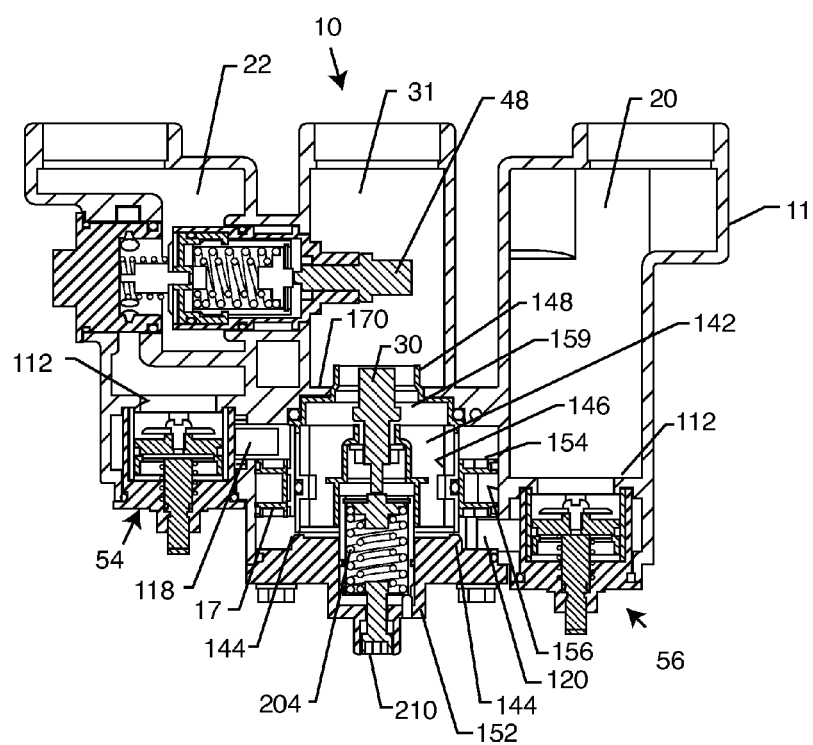
FIG. 13 is a horizontal sectional view similar to FIG. 12, but showing the thermostatic mixing valve unit in a normal flow condition.

FIGS. 4 and 6 show the high temperature limit valve 14 in accordance with one preferred form to comprise an assembly including a valve housing 58 having a size and shape to fit snugly into a laterally open bore 59 formed in the housing 11 (FIGS. 12-13). The valve housing 58 includes a short peripheral inner flange 60 for engaging and seating against a shoulder lining the housing bore 59 (FIGS. 12-13). In addition, the valve housing 58 defines an external groove to receive a seal member 62 such as a resilient O-ring or the like for sealingly engaging the housing 11 within the bore 59.

Figure 20:
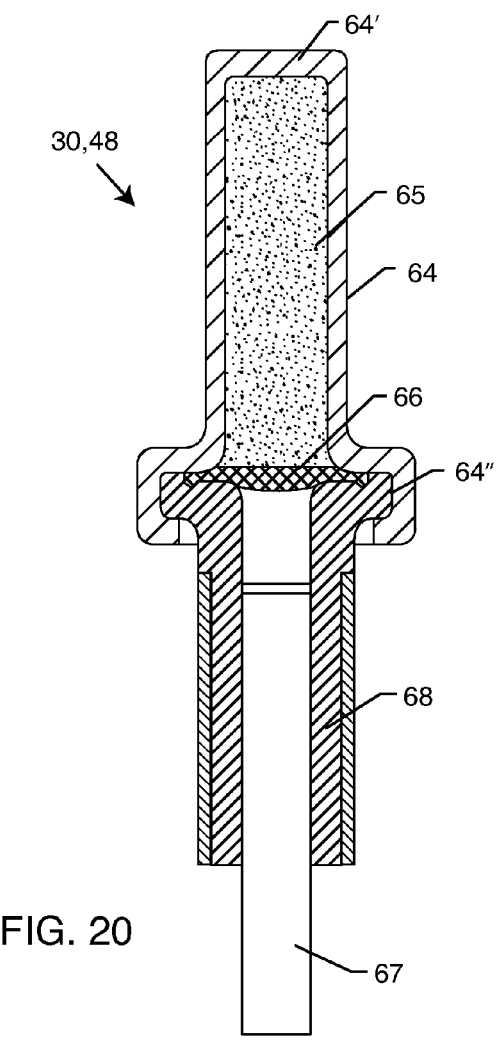
FIG. 20 is an enlarged vertical sectional view depicting one preferred form of a thermostatic element for use in the high temperature limit valve and/or in the thermostatic mixing valve of the valve unit of the present invention.

An inboard end 63 of the valve housing 58 of the high temperature limit valve 14 has a smaller or necked-down diametric size to fit through the housing bore 59. This inboard end 63 supports the thermostatic element 48 in a position within the tempered water discharge port 31 associated with the mixing valve 18 (FIGS. 12-13). An exemplary thermostatic element 48 is shown in more detail in FIG. 20 to comprise a metal casing 64 at one end encasing a selected temperature sensitive mixture 65 of metal particles (such as copper particles) and wax. One end of this metal casing 64 is closed by a metal casing end cap 64', and with the opposite end of the temperature-sensitive mixture 65 being defined by a radially enlarged flange 64" and closed by a rubber diaphragm 66 or the like. The metal casing 64 with temperature-sensitive material 65 therein responds to increased detected temperature by axially extending a probe 67 carried by an outer sleeve 68 mounted at the rubber diaphragm capped end of the casing 64. In a preferred form, for the thermostatic element 48, the wax (such as a single type of wax) is chosen to melt at a specific temperature, such as about 95° F.

The probe 67 bears against an overload housing cap 69 (FIG. 6) mounted slidably within a central bore 70 of the valve housing 58, with the cap 69 in turn bearing against a retaining ring 71 or the like. This overload housing cap 69 has multiple steps formed thereon to receive and support a pair of different diameter coil springs 72 and 73, both of which define opposite ends engaged with an inboard side of an open-ended overload housing 74. As shown in FIG. 6, the outboard or closed end of this overload housing 74 bears in turn against an open-ended and generally cylindrical poppet valve 75 received slidably within the valve housing 58 and adapted to engage a shoulder 76 (FIGS. 12-13) on an inboard end of an external cap 77 secured as by threaded connection into the housing 11. A pair of seal members 78, 79 such as resilient O-rings or the like are conveniently interposed between the external cap 77 and the housing 11.

An outboard face of the poppet valve 75 defines a short threaded bore 80 for receiving the threaded stem 81 of a retaining screw 82. This retaining screw 82 has its stem 81 extending axially through a pair of rubber and plastic washers 83, 84 into the threaded bore 80 of the poppet valve 75. A coil spring 85 reacts between the outboard face of the poppet valve 75 and an inboard face of the external cap 77, when said external cap 77 is installed onto the housing 11. Axially extending tabs 61 project from the end of the valve housing 58 and contact the cap shoulder 76 to define a hot water flow port for water flow past the high temperature limit valve 14 to the mixing valve 18.

With this construction, the thermostatic element 48 responds as a switch to the actual temperature of the tempered water discharge outflow within the outflow port 31 to permit or to prevent the hot water inflow to the mixing valve 18, when a predetermined maximum temperature level within the discharge port 31 is reached. More particularly, when a maximum temperature level such as about 95° F. is reached within the discharge port 31, the thermostatic element 48 expands axially to extend the probe 67 and thereby axially displace the overload cap 69 against the springs 72, 73 for applying an axial displacement force against the overload housing 74. This overload housing 74 in turn displaces axially against the poppet valve 75 within the valve housing 58 toward the adjacent shoulder 76 on the external cap 77 to prevent the flow of hot water from the hot water inflow port 22 through the high temperature limit valve 14 to the mixing valve 18, and further to the tempered water discharge outflow port 31. Importantly, the specific temperature at which the thermostatic element 48 functions to switch from a full open to a fully closed position is selected by control of the wax formulation comprising the temperature sensitive material 65.

Figure 5:
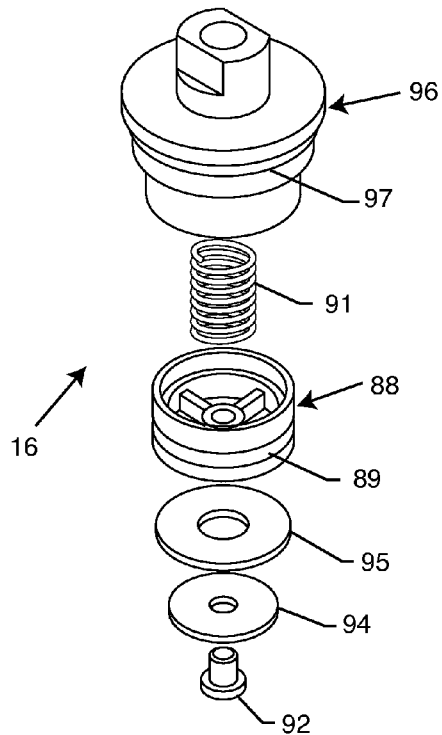
FIG. 5 is an exploded perspective view of the cold water bypass valve shown in FIG. 4.
Figure 18:
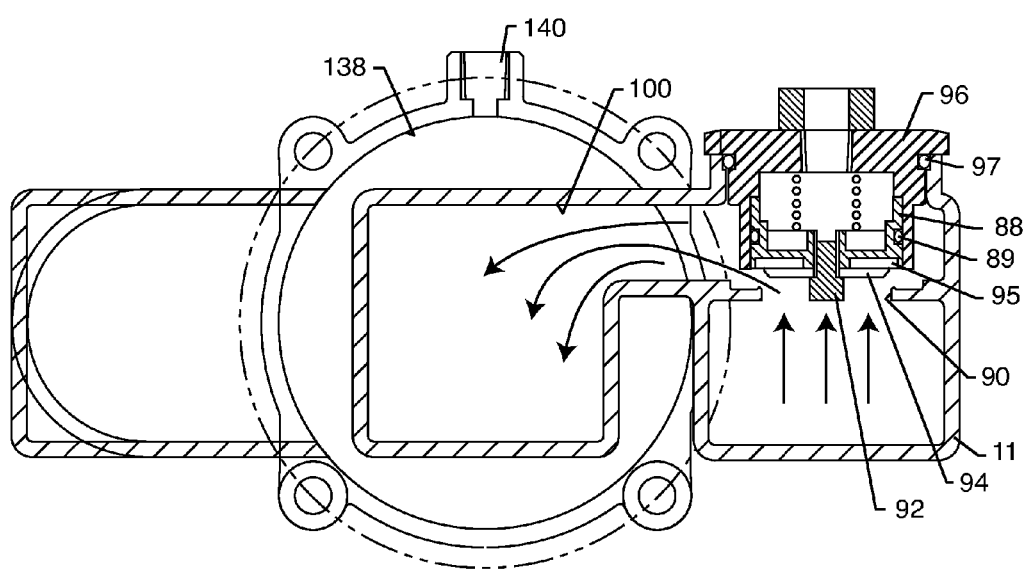
FIG. 18 is an enlarged vertical sectional view taken generally on the line 18-18 of FIG. 3.

The cold water bypass valve 16 is shown best in FIGS. 5 and 18, and generally comprises a spring-loaded poppet-type valve assembly for providing a regulated bypass of cold water inflow around the mixing valve 18 to the discharge outflow port 31. As shown, the cold water bypass valve 16 is installed within the unitized housing 11, preferably at the top thereof, in communication with the cold water inflow port 20 and therefore in communication with the pressure of water within said cold water inflow port 20. The poppet-type valve assembly comprises a generally cylindrical valve head or valve member 88 having a diametrically stepped external geometry to support a seal member 89 such as a resilient O-ring or the like in a position for engaging an annular valve seat 90 (FIG. 18) defined by the unitized housing 11. A coil spring 91 normally applies a closure force to this valve member 88, with a retainer screw 92 being threaded into a small threaded bore at a lower end or underside of the valve member 88 to mount face washers 94 and 95 thereon. An upper end of the coil spring 91 reacts between an upper side of the valve member 88 and an inboard or underside face of an external cap 96 having at least one seal member 97 such as a resilient O-ring or the like for sealing engagement with the housing 11. This external cap 96 is adapted for secure mounting onto the housing 11 as by a suitable thread-in connection or the like.

An elbow fitting 98 (FIGS. 2-3) or the like is connected through a port 99 formed in the external cap 97 for coupling an upper side of the valve member 88 via the tubing 28 and another elbow fitting 98' or the like to the diverter valve 17. While the construction and operation of the diverter valve 17 will be discussed herein in more detail, this applies a pressure differential to the valve member 88, resulting in bypass flow of cold water from the inflow port 20 through a short bypass passage 100 (FIG. 18) formed in the housing 11 to the discharge outlet 31. Importantly, the magnitude of the pressure differential applied across the valve member 88 functionally regulates the flow rate of cold water bypass flow through the bypass passage 100.

FIGS. 7-9 show construction details of the hot and cold water check valves 54, 56. Conveniently, the construction and operation of these two check valves 54, 56 are identical, whereby they will be shown and described herein by common reference numerals.

More specifically, each of the hot and cold water check valves 54, 56 is mounted within a front face of the housing 11 (FIG. 7). In general, each check valve 54, 56 includes an open-ended and generally cylindrical valve member 102 (FIGS. 8-9) loaded by a coil spring 104 or the like reacting between one side of the valve member 102 and an external cap 106 adapted for secure mounting onto the housing 11 as by means of a suitable thread-in connection or the like. A screw 108 passes through a pair of face washers 109, 110 or the like to attach these face washers to an inboard side of the valve member 102. The spring 104 resists inflow pressure as the associated hot or cold water side until the inflow pressure overcomes the closure-biasing spring force to cause valve member 102 retraction relative to an annular valve seat 112 (FIG. 13) defined within the housing 11. Conveniently, such opening retraction of the valve member 102 is guided within a generally cylindrical cage 114, which in turn can be disposed within a cylindrical mesh screen filter 116 or the like.

An adjustment screw 93 is carried within the spring 104, and has an inboard end abutting outboard face of the valve member 102, and an outboard end exposed through a central port formed in the external cap 106. A seal member, such as a resilient O-ring or the like, is carried on the screw 93 prevent water leakage from the housing 11.

In a normal spring-loaded position, the valve member 102 of each of the hot and cold water check valves 54, 56 is seated against the associated valve seat 112 by means of the spring 104. Accordingly, in this normal position, both check valves 54, 56 are in a closed, no-flow position, as shown in FIG. 12. In this closed, no-flow position, there is no flow of either hot or cold water to the mixing valve 18, and correspondingly no flow of tempered water via the discharge outflow port 31.

Conversely, when hot and cold water are supplied at sufficient pressure to the housing 11 via the hot water inflow port 22 and the cold water inflow port 20, the associated check valves 54, 56 retract against the water pressure to open the valve members 102 relative to the associated valve seats 112, as shown in FIG. 13. When this occurs, hot and cold water are permitted to flow to the mixing valve 18 which mixes these water inflows and supplies them as the tempered water discharge at the outflow port 31. Supply of hot water to the mixing valve 18 may, of course, be blocked by the high temperature limit valve 14, as previously described herein.

As shown best in FIGS. 12 and 13, the hot and cold water check valves 54, 56 are axially staggered on the housing 11 relative to each other, so that hot and cold water passing respectively through these two check valves 54, 56 initially enters different annular passages within the housing 11. That is, hot water passing through an open hot water check valve 54 initially enters an annular hot water chamber 118 (FIG. 13), whereas cold water initially passing through an open cold water check valve 56 initially enters an annular cold water chamber 120. These two annular chambers 118, 120 are axially separated from each other, and, at one side of the diverter valve 17, whereby these chambers 118, 120 are disposed generally at opposite axial ends of the diverter valve 17.

Figure 19:
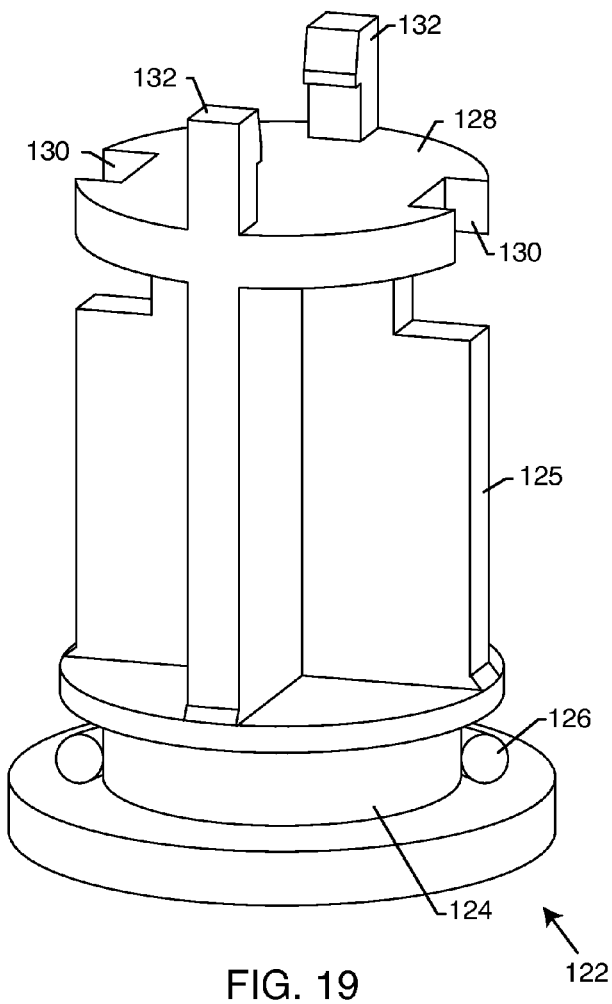
FIG. 19 is an enlarged perspective view showing one portion of an exemplary diverter valve head for use in the thermostatic mixing valve unit of the present invention.

The diverter valve 17 functions to connect the lower of the two hot and cold water pressures within the two chambers 118, 120 via the tubing 28 to the upper or downstream side of the cold water bypass valve 16. More specifically, the diverter valve 17 comprises in the preferred form a pair of valve segments 122 (FIG. 19) which are adapted for interconnection as by snap-fitting. FIG. 19 shows one of these valve segments 122 to include an end groove 124 for receiving a seal member 126 such as a resilient O-ring or the like. From the end groove 124, the segment 122 extends with a reduced cross sectional size with outwardly radiating ribs 125 to a central end plate 128 having a pair of notches 130 formed therein in combination with a pair of upstanding inwardly barbed feet 132 formed preferably at a right angle to said notches 130. With this construction, two identical diverter valve segments 122 are designed for quick and easy snap-fit assembly with their respective barbed feet 132 snap-fitted into the notches 130 of the other valve segment 122, to disposed their respective central end plates 128 in abutting relation.

Figure 25:
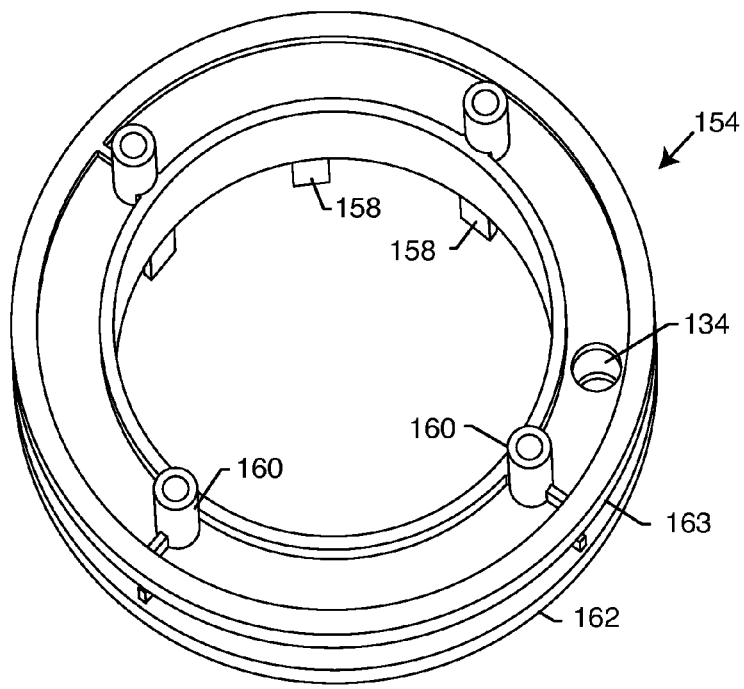
FIG. 25 is an enlarged rear side perspective view of an annular sleeve for use in the thermostatic mixing valve of the present invention.
Figure 26:
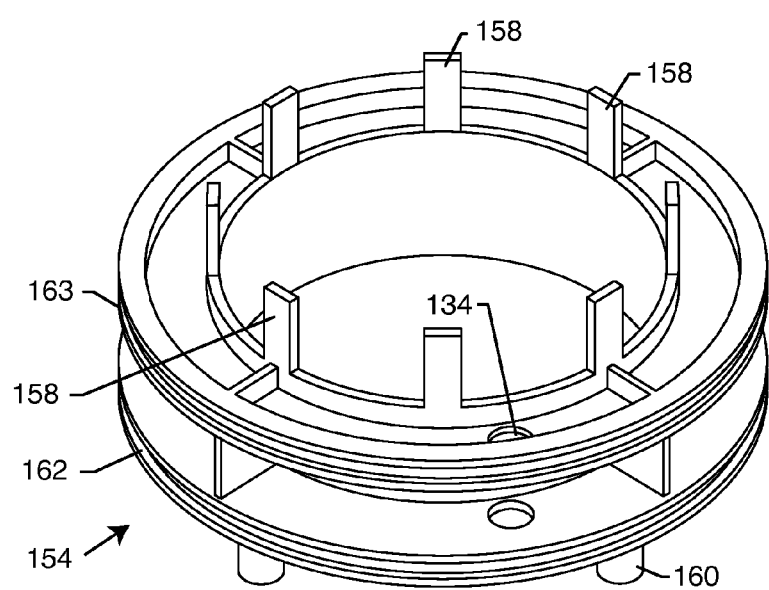
FIG. 26 is a front side perspective view of the sleeve shown in FIG. 25.

The thus-assembled diverter valve 17 is positioned within a short axial channel 134 (shown best in FIG. 25) separating the hot and cold water chambers 118, 120, with the seal members 126 thereon respectively disposed outboard adjacent a corresponding pair of valve seats on a sleeve 154 (FIGS. 25-26). The diverter valve 17 is thus positioned relative to the valve seats so that the higher fluid pressure in one of the chambers 118, 120 pushes the diverter valve 17 (with the seal member 126) axially against the adjacent one of the sleeve valve seats, and thereby opens the opposite sleeve valve seat to permit the lower of the two pressures to enter the channel 134.

Importantly, the channel 134 is coupled via an annular passageway 138 to a port 140 (FIGS. 11 and 18) on the housing 11 carrying the second elbow fitting 98' (FIGS. 2-3) connected to the tubing 28. Accordingly, the diverter valve 17 couples the lower of the hot and cold water inlet pressures to the upper side of the poppet-type valve member 88 of the cold water bypass valve 16, with a lower side of this valve member 88 being exposed to pressure within the cold water inflow port 20.

Figure 10:
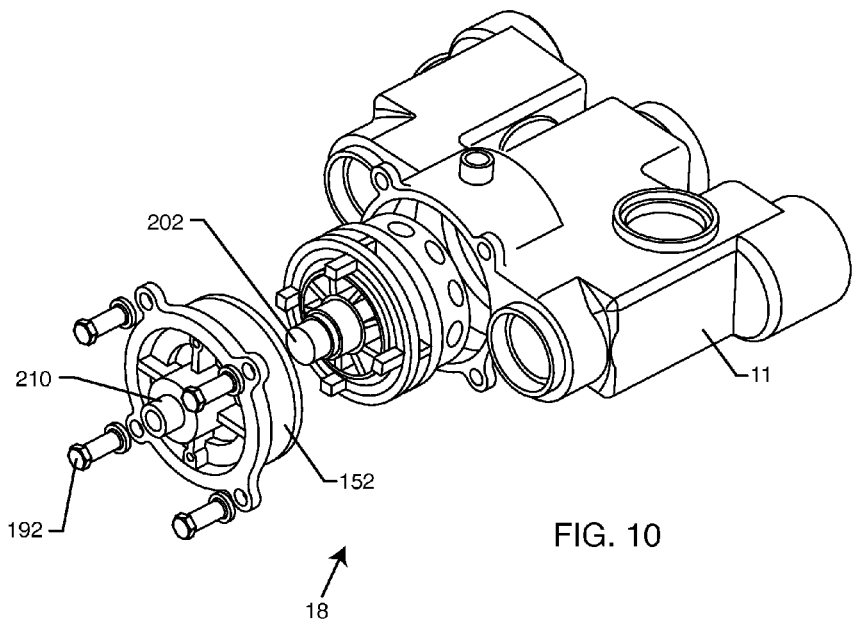
FIG. 10 is a perspective view similar to FIG. 2, but illustrating portions of a thermostatic mixing valve in exploded relation.
Figure 11:
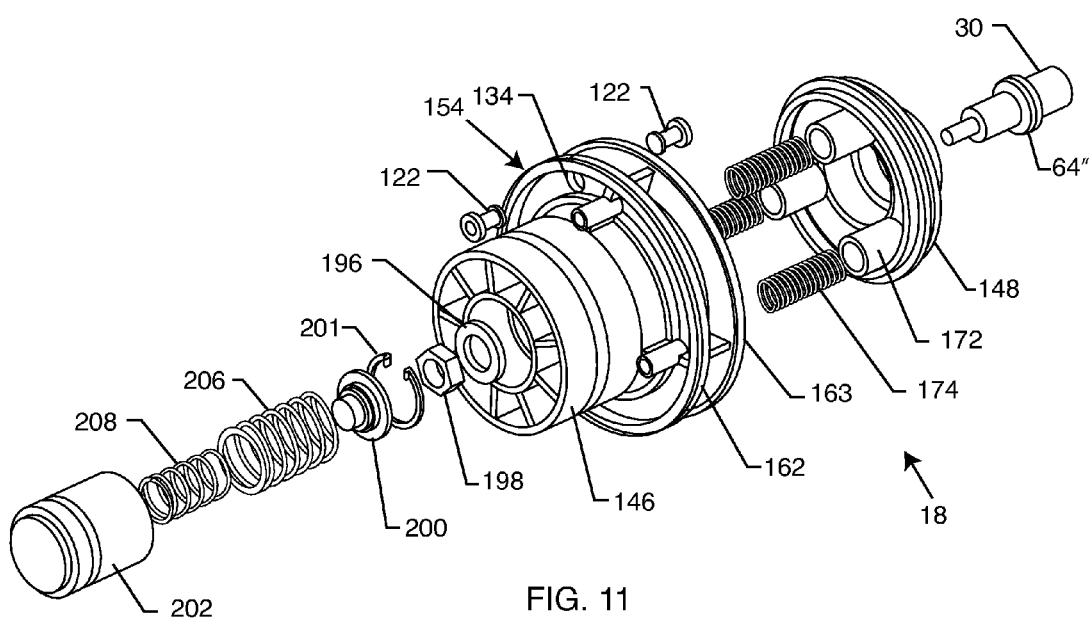
FIG. 11 is an exploded perspective view of further portions of the thermostatic mixing valve shown in FIG. 10.

From the hot water chamber 118, the hot water flows further to the mixing valve 18 through a small annular gap or orifice 142 (FIG. 13), for mixture with the cold water flowing to the mixing valve 18 through a small annular gap or orifice 144 (FIG. 13). These gaps 142, 144 are defined respectively between adjacent annular edges of a generally cylindrical valve plunger 146 and a valve funnel 148, and between an axially opposite annular edge of the valve plunger 146 and a shoulder valve seat on an external cap 152 (FIGS. 10-11 and 13). In general, the valve plunger 146 is axially carried or shifted in response to the specific temperature of the tempered water discharge outflow in the discharge port 31 as monitored by the thermostatic element 30. The valve plunger 146 is shifted to inversely increase or decrease the hot water flow relative to the cold water flow to increase or decrease the tempered water temperature in the discharge outflow port 31, as needed.

The mixing valve 18 is shown in exploded relation in FIGS. 10-11, and in sectional view in FIGS. 12-13. As shown, the mixing valve 18 comprises an outer cylindrical sleeve 154 (shown best in FIGS. 25-26) slidably fitted into a central bore 156 (FIG. 13) of the unitized housing 11. A plurality of circumferentially spaced tabs 158 (shown best in FIG. 26) project axially in one direction from the sleeve 154 to position the sleeve 154 within the housing 11, while permitting hot water flow from the annular hot water chamber 118 into a mixing chamber 159 (FIG. 14) of the mixing valve 18, with the tabs 158 provided enhanced turbulent water flow. Another plurality of circumferentially spaced posts 160 (shown best in FIG. 25) project axially from an opposite face of the sleeve 154 to permit cold water flow from the cold water chamber 120 into the mixing chamber 159. Accordingly, the sleeve 154 is mounted within the housing 11 between the hot and cold water chambers 118, 120, with a pair of seal members 162, 163 such as a pair of resilient O-rings supported on the axially opposed peripheral edges thereof. The diverter valve 17 is slidably carried by the sleeve 154 within the axially extending bore 134 formed therein, with the region between the seal members 162, 163 being in flow communication with the port 140 having the second elbow fitting 98' installed therein.

Figure 21:
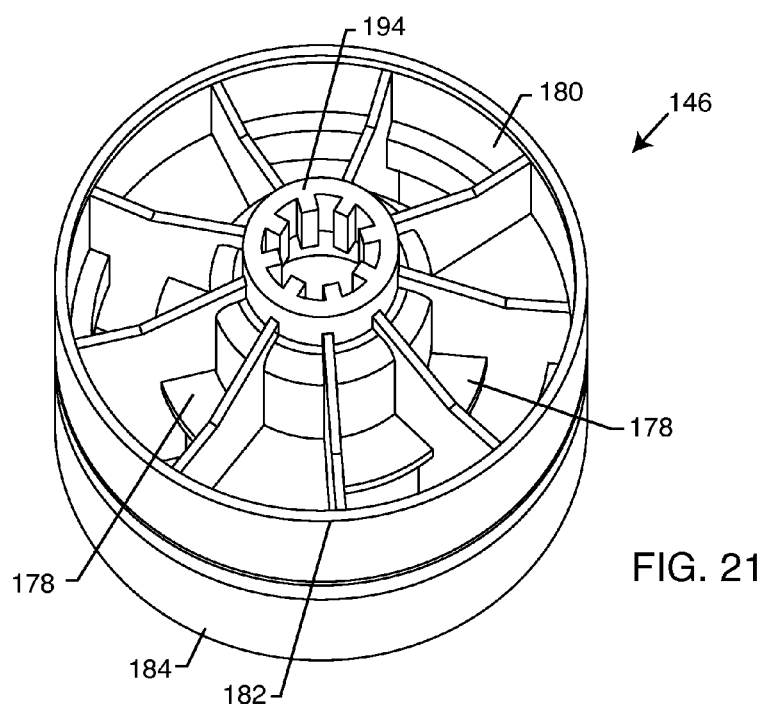
FIG. 21 is an enlarged rear side perspective view of a movable plunger for use in the thermostatic mixing valve of the present invention.
Figure 22:
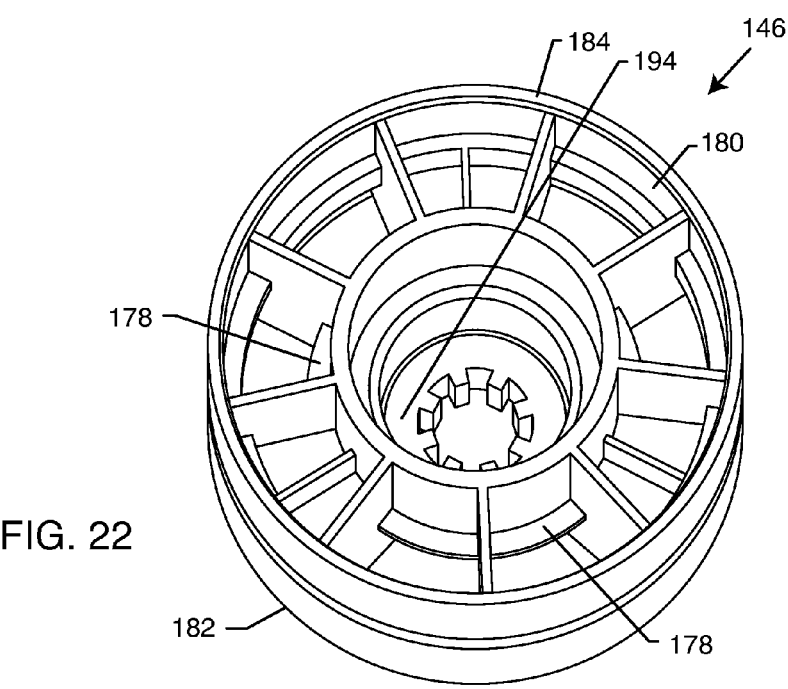
FIG. 22 is a front side perspective view of the plunger shown in FIG. 21.
Figure 23:
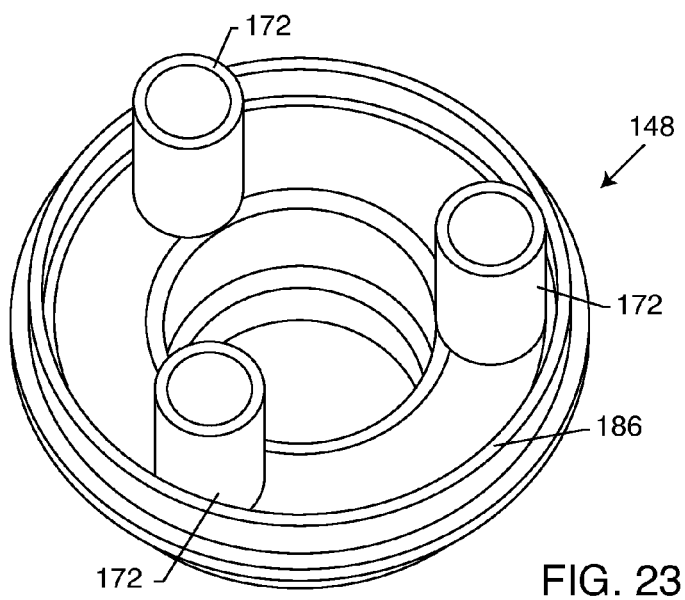
FIG. 23 is an enlarged rear or upstream side perspective view of a funnel for use in the thermostatic mixing valve of the present invention.
Figure 24:
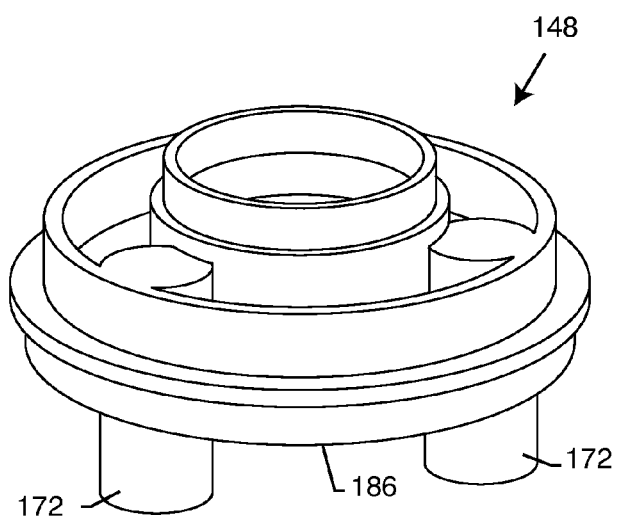
FIG. 24 is a front or downstream side perspective view of the funnel shown in FIG. 23.

The funnel 148 (also shown in FIGS. 23-24) is seated within the housing 11 and cooperates with the movable plunger 146 (also shown in FIGS. 21-22) for regulating hot and cold water inflows respectively and in inverse proportion from the hot and cold water chambers 118, 120 into the mixing chamber 159. More specifically, the funnel 148 is seated within the housing 11 as by abutting engagement of an externally narrowing or tapering portion with a shoulder wall 170 (FIG. 13) within the housing 11. A plurality of at least three spring posts 172 (FIGS. 11 and 23) project upstream from the funnel 148 and respectively support a corresponding number of coil springs 174 (FIG. 11) which seat with balanced forces against a central wall portion 178 (FIGS. 21-22) of the movable plunger 146. An outer cylindrical wall portion 180 (FIGS. 21-22) of the plunger 146 is joined integrally to this central wall portion, and defines downstream- and upstream-facing edges 182 and 184. This downstream-facing edge 182 is positioned in axial proximity with a similar diameter upstream-facing edge 186 of the funnel 148 (FIGS. 23-24) to define annular valve seat or gap 142 (FIG. 13) for regulating hot water flow from the hot water chamber 118 into the mixing chamber 159. Similarly, the upstream-facing edge 184 of the movable plunger 146 is positioned in axial proximity with the similar diameter downstream-facing annular shoulder edge on the external cap 152 for the mixing valve 18. The external cap 152 is securely mounted onto the housing 11 as by means of multiple threaded bolts or screws 192 (FIG. 10).

A central stepped boss 194 of the plunger 146 (shown best in FIGS. 21-22) carries the thermostatic element 30 for temperature responsive control positioning of the movable plunger 146. This thermostatic element 30 corresponds with the rendering shown in FIG. 20, to include the metal casing 64 receiving and enclosing the metal-wax alloy temperature sensitive material 65 for extending the elongated probe 67 when the outlet temperature of the tempered water discharge outflow within the discharge port 31 rises above the preset temperature. In the case of the thermostatic element 30, in one preferred form, the wax component comprises a mixture of multiple different waxes (10 in the preferred form) to create a wax alloy, with the wax components being adapted to melt first at about 60° F. to begin extension of the probe 67 and progressively (linearly) thereafter to provide modulated or regulated hot water temperature control at about 85° F. In the preferred form, the thermostatic element 30 is designed to continue probe extension until about 105° F.

The radially enlarged flange 64" (FIGS. 11 and 20) on the thermostatic element 30 is fitted snugly against a downstream face of the central boss 194, with a washer 196 and nut 198 being provided for securely connecting this thermostatic element 30 (FIGS. 11-13) within the central boss 194 of the plunger 146. The metal casing 64 of the thermostatic element 30 is thus positioned axially within or a short distance beyond the funnel 148 for sensing and responding to the temperature of the discharge tempered water within the outflow port 31.

An upstream-facing end of the probe 67 associated with the thermostatic element 30 engages an overload insert 200 (FIG. 11) seated by a retaining ring 201 within the open end of an open-ended overload housing 202 having a size and shape for slide-fit reception into a shallow bore 204 (FIG. 13) formed at the inboard side of the external cap 152. A pair of overload springs 206 and 208 (FIG. 11) react between the overload housing 202 and the overload insert 200, wherein these overload springs 206, 208 effectively function during normal operation as a solid block. These overload springs 206, 208 are designed to provide some resiliency to safeguard the components of the mixing valve 18 during excess temperature operation. During normal operation, the thermostat probe 67 responds by extension to increased water outflow temperature within the discharge port 31 by shifting the plunger 146 (as viewed in FIGS. 12-14) upwardly to reduce the annular gap between the facing edges 182, 186 of the plunger 146 and funnel 148 (defining the hot water gap 142) to reduce hot water inflow into the mixing chamber 159, while correspondingly increasing the annular gap between the edges 184 of the plunger 146 and the external cap 152 (defining the cold water gap 144). An opposite effect occurs when the probe 67 retracts due to decreased water temperature within the discharge outflow port 31.

The specific water outflow temperature is regulated by the thermostatic element 30 is adjustably selected by means of an adjustment screw 210 (FIGS. 10, 12-14 and 16). More particularly, the adjustment screw 210 includes a shaft threaded into a small bore formed in the external cap 152 to bear upon the spring-loaded overload housing 202, to adjustably set the specific or predetermined temperature at which the thermostat probe 67 extends. A set screw (not shown) or the like is fitted a the port 214 to provide a stop defining a maximum outlet temperature setting for the mixing valve 18.

In a preferred form, the thermostatic element 30 of the mixing valve 18 is adjustably set to extend the associated probe 67 at a selected or predetermined temperature level slightly less that the setting of the thermostatic element 48 of the high temperature limit valve 14. In a preferred form, the thermostatic element 30 of the mixing valve 18 is set to modulate or restrict hot water flow to the mixing chamber 159 to maintain the tempered water temperature within the outflow port 31 from a minimum of about 60° F. to a maximum (when the hot water flow from chamber 118 into the mixing chamber 159 is substantially closed off) of about 85° F. By contrast, the thermostatic element 48 associated with the high temperature limit valve 14 is set to operate as a safety switch for preventing hot water flow past the associated valve seat (as by contact of the rubber washer 83 with the cap shoulder 76) to the mixing valve 18 when the tempered water temperature within the outflow port 31 reaches a higher water temperature of about 95° F.; below that temperature, the high temperature limit switch 14 is essentially full open. Importantly, as shown in the accompanying drawings, the external cap 152 of the mixing valve 18 carries the adjustment screw 210 in a position exposing a slotted head of the like thereof to external access.

FIG. 12 shows the thermostatic mixing valve unit 10 of the present invention in a no-flow condition wherein both the hot and cold water inflows respectively at the hot and cold water inflow ports 22, 20 are shut off. In this condition, the hot and cold water check valves 54, 56 are also in a closed condition, to prevent water flow to the mixing valve 18.

FIG. 13 shows the valve unit 10 in a normal operational condition, wherein hot and cold water supplies are coupled respectively to the hot and cold water inlets 22, 20. In this condition, the hot and cold water check valves 54, 56 are in an open condition, with the mixing valve 18 and the associated thermostatic element 30 regulating the specific hot and cold water inflows to the mixing chamber 159, so that the tempered water temperature as measured by the thermostatic element 30 is about 85° F. In this normal operational condition, the high temperature limit valve 14 maintains the associated valve seat in a substantially fully open position to permit hot water flow therethrough, since the outflow temperature in the discharge port 31 is below the 95° F. setpoint. The lower of the hot and cold water pressures in the hot and cold water chambers 118, 120 is coupled by the diverter valve 17 to the upper side of the cold water bypass valve 16, with cold water inlet pressure being coupled to the lower side of the bypass valve 16. As shown, during normal operation of the valve unit 10, the differential pressure across the cold water bypass valve 16 is insufficient to open the bypass valve.

Figure 14:
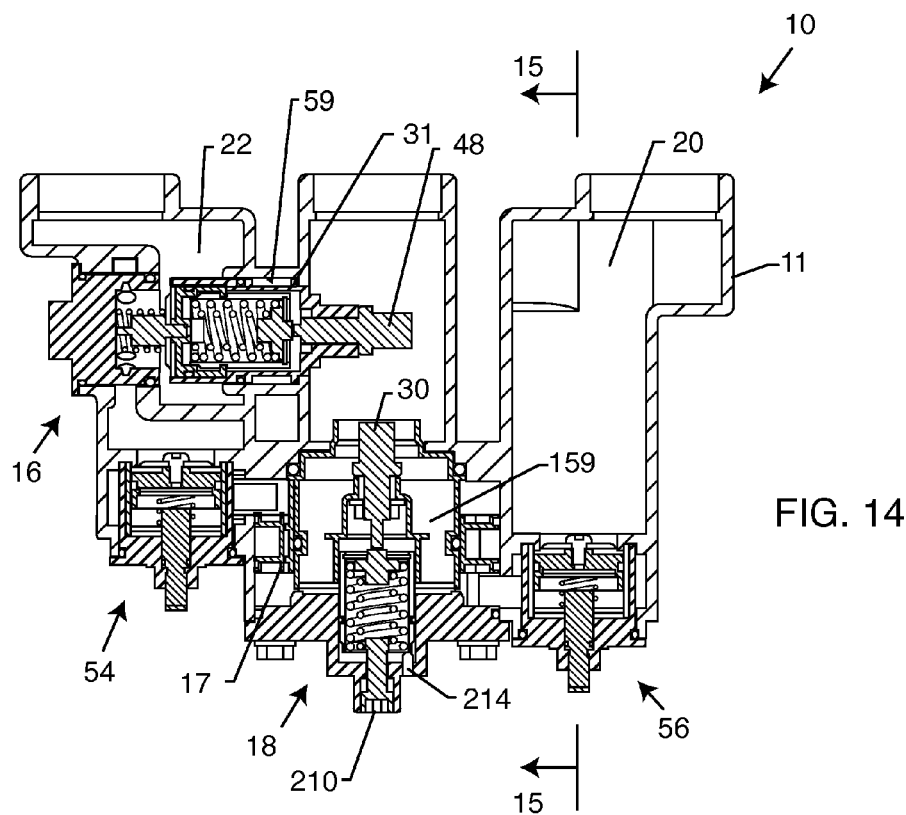
FIG. 14 is a horizontal sectional view similar to FIGS. 12 and 13, but showing the thermostatic mixing valve in a first failure mode with the cold water check valve stuck in a closed position.
Figure 15:
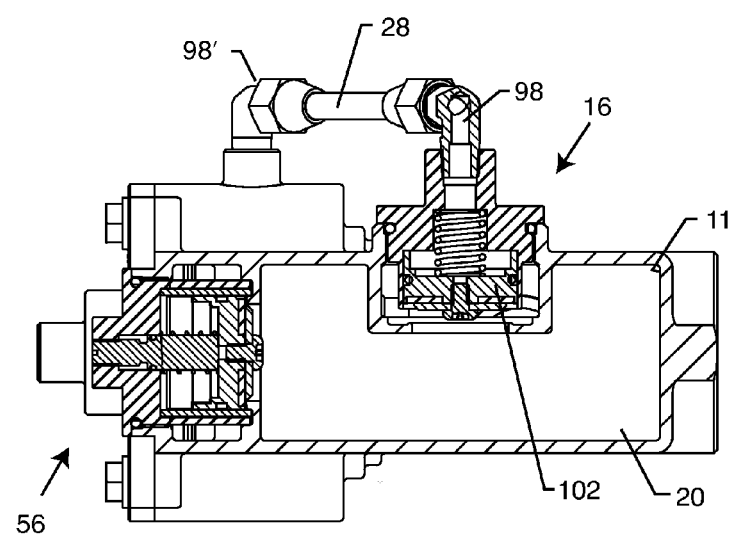
FIG. 15 is a vertical sectional view taken generally on the line 15-15 of FIG. 14, and illustrates bypass of cold water through the cold water bypass valve.

FIGS. 14-15 show one potential failure mode of the valve unit 10. In particular, FIG. 14 shows sticking of the cold water check valve 56 in a closed position. During this failure mode, hot water only is supplied via the open hot water check valve 54 to the mixing chamber 159. However, excessive temperature levels at the discharge outlet 31 are avoided by means of the cold water bypass valve 16.

More specifically, with reference to FIG. 14, upon sticking of the cold water check valve 56 in the closed position, the diverter valve 17 immediately applies the lower of the hot and cold water pressures to the upper side of the cold water bypass valve 16. Since this "lower" of the two pressures is essentially zero, due to the absence of cold water flow downstream of the cold water check valve 56 within the cold water chamber 120, the pressure differential across the poppet-type valve head or valve member 88 of the cold water bypass valve 16 is sufficient to displace this valve head 88 to an open position (FIGS. 15 and 18) permitting substantial bypass of cold water past the mixing valve 18 and directly into the discharge port 31 via the bypass passage 100 (FIG. 18). As a result, the tempered water discharge temperature within the discharge port 31 does not exceed a safe temperature level. Instead, the thermostatic element 30 of the mixing valve 18 continues to modulate hot water inflow to the mixing chamber 159 sufficiently to prevent excess tempered water outflow temperature.

Figure 16:
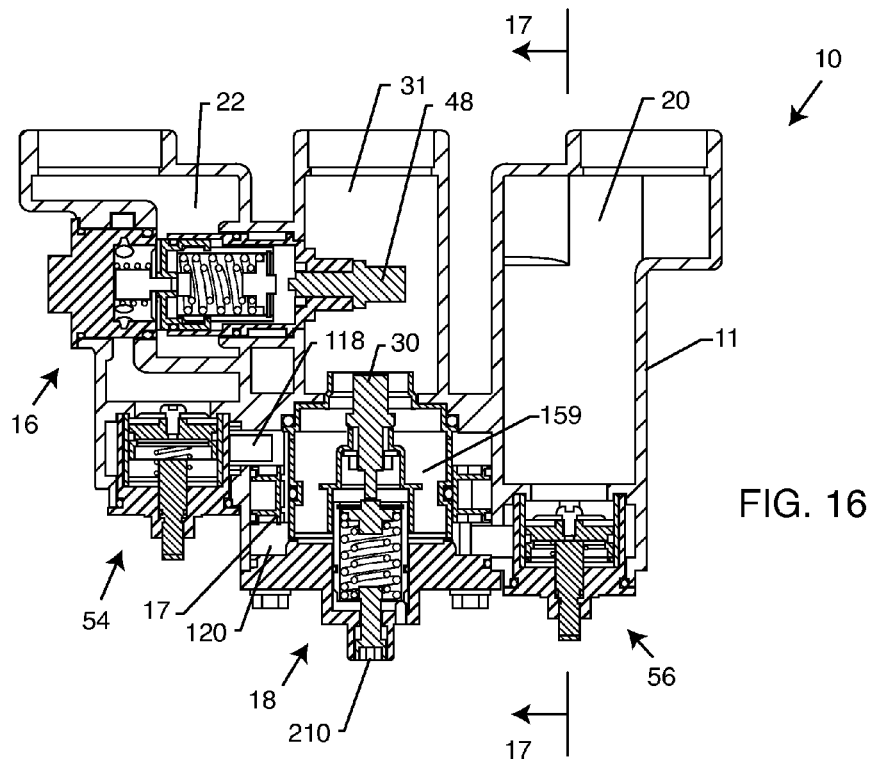
FIG. 16 is a horizontal sectional view similar to FIGS. 12-14, but illustrates the thermostatic mixing valve in a second failure mode with the hot water check valve stuck in a closed position.
Figure 17:
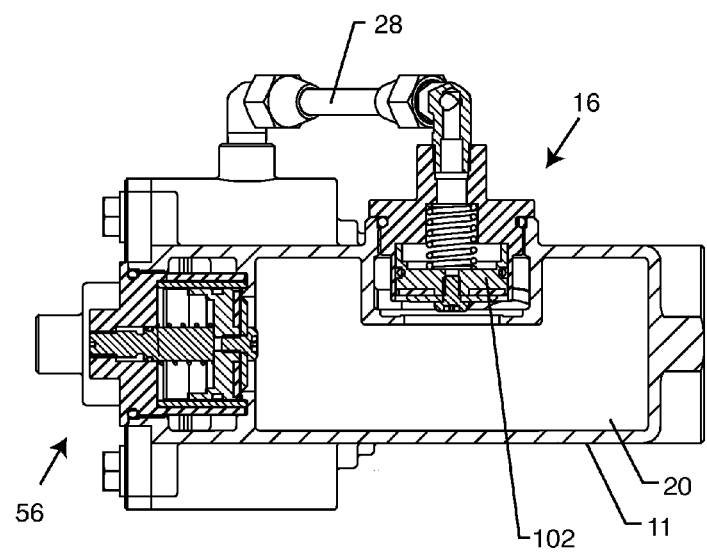
FIG. 17 is a vertical sectional view taken generally on the line 17-17 of FIG. 16, and shows bypass of cold water through the cold water bypass valve.

FIGS. 16-17 illustrate other potential failure mode of the thermostatic mixing valve unit 10, and corresponding operation of the valve unit components to prevent undesirable excess temperature within the discharge port 31. As shown in FIG. 16, in the event the hot water check valve 54 sticks in a closed position, thereby precluding hot water inflow to the mixing chamber 159, the diverter valve 17 immediately applies the lower of the hot and cold inflow pressures within the hot and cold water chambers 118, 120 to the upper side of the cold water bypass valve 16. In such event, the lower of the two pressures is now the hot water pressure within the hot water chamber 118 downstream from the hot water check valve 54 stuck in the closed position. The resultant pressure differential across the valve member 102 of the cold water bypass valve 16 results in opening displacement of this valve member 102 (FIGS. 17-18) to permit a substantial cold water bypass flow (FIG. 18) in the same manner as previously described. It is noted that the resultant total flow in the discharge port 31 now comprises cold water at a temperature well below the preferred 85° F. tempered water discharge temperature, but this cold water temperature will permit continued use of the associated emergency wash station 12 without scalding or otherwise harming a person using the wash station.

In an alternative failure mode, in the event of sticking of the mixing valve 18 and/or failure of the associated thermostatic element 30 to maintain a desired tempered water discharge temperature (about 85° F. in a preferred embodiment), the hot water check valve 56 will be open to permit continued hot water inflow to the mixing chamber 159. However, during such failure mode, the high temperature limit valve 14 will then function as an on-off temperature switch. More specifically, the high temperature limit valve 14 will extend its associated probe 67 to close the valve seat and thereby shut off hot water inflow to the mixing valve 18. During this mode, the diverter valve 17 will couple the lower pressure of the hot and cold water supplies within the associated hot and cold water chambers 118, 120 to the upper side of the cold water bypass valve 16. Since the hot water flow within the chamber 118 is essentially at a zero pressure, the diverter valve 17 couples this low hot water pressure to the bypass valve member 102, resulting in movement of the bypass valve member 102 to an open position (as viewed in FIG. 17) for bypass of sufficient cold water around the mixing valve 18 to the discharge port 31. Once again, the water temperature at the discharge outlet 31 may be relatively below the desired 85° F. tempered water temperature, but risk of scalding a person using the wash station 12 is essentially eliminated.

In the event that the hot water supply fails completely, e.g., as by non-supply of hot water to the associated hot water inflow port 22, then the operational state of the valve unit 10 is the same as described above with respect to sticking of the hot water check valve 54 in the closed position.

In the event of failure to supply cold water as by failure of any cold water to reach the cold water inflow port 20, then the high temperature limit valve 14 functions to completely shut off the hot water flow past the associated valve seat, thereby completely halting any discharge outflow via the outflow port 31.

Accordingly, during normal operation and also during a number of different potential failure modes, the valve unit 10 of the present invention effectively maintains a substantial discharge water outflow at the discharge port 31 at a relative low or safe tempered water temperature, by means of the diverter valve 17 coupling the lower of the two hot water and cold water supply pressures to a cold water bypass valve 16—all in a valve unit construction which beneficially includes both hot and cold water check valves 54 and 56 to prevent undesired backflow within the plumbing system. Only upon failure of a cold water supply does the unit 10 completely shut off to prevent any water outflow at the discharge port 31.

A variety of further modifications and improvements in and to the thermostatic mixing valve unit of the present invention will be apparent to persons skilled in the art. Accordingly, no limitation on the invention is intended by way of the foregoing description and accompanying drawings, except as set forth in the appended claims.

What is claimed is:

1. A thermostatic mixing valve unit, comprising:
    a housing defining a hot water inlet, a cold water inlet, and a water discharge outlet;
    a hot water check valve carried by said housing at said hot water inlet;
    a cold water check valve carried by said housing at said cold water inlet;
    a mixing valve carried by said housing downstream of said hot and cold water check valves;
    a first thermostatic valve element configured to operate said mixing valve to provide a water outflow through said water discharge outlet;
    a high temperature limit valve including a second thermostatic valve element configured to modulate hot water inflow to said mixing valve in the event that the water outflow temperature exceeds a predetermined limit, said first thermostatic valve element operating said mixing valve to provide said water outflow within a temperature range below said predetermined limit;
    a cold water bypass valve configured to bypass cold water flow around said cold water check valve to said water discharge outlet in response to a failure of said cold water check valve; and
    a diverter valve positioned in said housing downstream of said hot and cold water check valves and upstream of said mixing valve configured to couple the lower of the hot water pressure and the cold water pressure downstream from said hot and cold water check valves to a downstream side of said cold water bypass valve, in response to an activation of the high temperature limit valve or failure of the hot water check valve;
    whereby the thermostatic mixing valve unit normally supplies a water discharge outflow at a temperature below said predetermined limit, said mixing valve unit being responsive to failure of said hot or cold water check valves or said mixing valve to prevent the temperature of the water discharge outflow from exceeding said predetermined limit.

2. The thermostatic mixing valve unit of claim 1 wherein said housing is substantially one-piece.

3. The thermostatic mixing valve unit of claim 1 wherein said hot and cold water inlet flank said water discharge outlet.

4. The thermostatic mixing valve unit of claim 3 wherein said hot and cold water check valves flank said mixing valve mounted on said housing at a side thereof generally opposite said hot and cold water inlets and said water discharge outlet.

5. The thermostatic mixing valve unit of claim 1 wherein said hot and cold water check valves are mounted on said housing in spaced relation relative to one another for supplying hot and cold water respectively to a pair of hot and cold water chambers in fluid communication with said mixing valve.

6. The thermostatic mixing valve unit of claim 1 wherein said high temperature limit valve comprises said second thermostatic valve element exposed to water temperature within said water discharge outlet, and a valve member mounted generally within said hot water inlet at a position upstream from said hot water check valve, said valve element being responsive to said second thermostatic valve element for modulating hot water inflow to said hot water check valve when the temperature of the water within the water discharge outlet exceeds said predetermined limit.

7. The thermostatic mixing valve unit of claim 1 wherein said predetermined limit is about 95° F.

8. The thermostatic mixing valve unit of claim 1 wherein said diverter valve comprises a valve plug with opposite ends thereof exposed respectively to the hot and cold water supply pressures at a point downstream from said respective hot and cold water check valves, said valve plug being movably responsive to the difference between said hot and cold water supply pressures for communicating the lower of said hot and cold water supply pressures to the downstream side of said cold water bypass valve.

9. A thermostatic mixing valve unit, comprising:
    a housing defining a hot water inlet, a cold water inlet, and a water discharge outlet;
    a hot water check valve carried by said housing at said hot water inlet;
    a cold water check valve carried by said housing at said cold water inlet;
    a mixing valve carried by said housing downstream of said hot and cold water check valves;
    a thermostatic valve element configured to operate said mixing valve to provide a water outflow within a selected temperature range through said water discharge outlet;
    a cold water bypass valve configured to cold water flow around said cold water check valve to said water discharge outlet in response to a failure of said cold water check valve; and
    a diverter valve positioned in said housing downstream of said hot and cold water check valves and upstream of said mixing valve configured to couple the lower of the hot water pressure and the cold water pressure downstream from said hot and cold water check valves to a downstream side of said cold water bypass valve, in response to an activation of the high temperature limit valve or failure of the hot water check valve;
    whereby the thermostatic mixing valve unit normally supplies a water discharge outflow within said selected temperature range, said mixing valve unit being responsive to failure of said hot or cold water check valves for opening said cold water bypass valve to prevent the temperature of the water discharge outflow from exceeding the selected temperature range.

10. The thermostatic mixing valve unit of claim 9 wherein said housing is substantially one-piece.

11. The thermostatic mixing valve unit of claim 9 wherein said hot and cold water inlet flank said water discharge outlet at one side of said housing, and further wherein said hot and cold water check valves flank said mixing valve mounted on said housing at a generally opposite side thereof.

12. The thermostatic mixing valve unit of claim 9 wherein said hot and cold water check valves are mounted on said housing in spaced relation relative to one another for supplying hot and cold water respectively to a pair of hot and cold water chambers in fluid communication with said mixing valve.

13. The thermostatic mixing valve unit of claim 9 wherein said thermostatic valve element comprises a first thermostatic valve element, and further comprising a high temperature limit valve including a second thermostatic valve element for modulating hot water inflow to said mixing valve in the event that the water outflow temperature exceeds a predetermined limit higher than said selected temperature range.

14. The thermostatic mixing valve element of claim 13 wherein said high temperature limit valve comprises said second thermostatic valve element exposed to water temperature within said water discharge outlet, and a valve member mounted generally within said hot water inlet at a position upstream from said hot water check valve, said valve element being responsive to said second thermostatic valve element for modulating hot water inflow to said hot water check valve when the temperature of the water within the water discharge outlet exceeds said predetermined limit.

15. The thermostatic mixing valve unit of claim 14 wherein said predetermined limit is about 95° F.

16. The thermostatic mixing valve unit of claim 9 wherein said diverter valve comprises a valve plug with opposite ends thereof exposed respectively to the hot and cold water supply pressures at a point downstream from said respective hot and cold water check valves, said valve plug being movably responsive to the difference between said hot and cold water supply pressures for communicating the lower of said hot and cold water supply pressures to the downstream side of said cold water bypass valve.

17. A thermostatic mixing valve unit, comprising:
- a housing defining a hot water inlet, a cold water inlet, and a water discharge outlet;
- a hot water check valve carried by said housing at said hot water inlet;
- a cold water check valve carried by said housing at said cold water inlet;
- a mixing valve carried by said housing downstream of said hot and cold water check valves;
- a first thermostatic valve element configured to operate said mixing valve to provide a water outflow within a selected temperature range through said water discharge outlet;
- a high temperature limit valve including a second thermostatic valve element configured to modulate hot water inflow to said mixing valve in the event that the water outflow temperature exceeds a predetermined limit higher than said selected temperature range;
- a cold water bypass valve configured to bypass cold water flow around said cold water check valve to said water discharge outlet in response to a failure of said cold water check valve; and
- a diverter valve positioned in said housing downstream of said hot and cold water check valves and upstream of said mixing valve configured to couple the lower of the hot water pressure and the cold water pressure downstream from said hot and cold water check valves to a downstream side of said cold water bypass valve, in response to an activation of the high temperature limit valve or failure of the hot water check valve;
- whereby the temperature of the water flow within the water discharge outlet is maintained below said predetermined limit notwithstanding failure of said hot or cold water check valves or said mixing valve.

18. The thermostatic mixing valve unit of claim 17 wherein said housing is substantially one-piece, and further wherein said hot and cold water inlet flank said water discharge outlet at one side of said housing, said hot and cold water check valves flanking said mixing valve mounted on said housing at a generally opposite side thereof, said hot and cold water check valves being mounted on said housing in spaced relation relative to one another for supplying hot and cold water respectively to a pair of hot and cold water chambers in fluid communication with said mixing valve.

19. The thermostatic mixing valve of claim 17 wherein said predetermined limit is about 95° F.

20. The thermostatic mixing valve unit of claim 17 wherein said diverter valve comprises a valve plug with opposite ends thereof exposed respectively to the hot and cold water supply pressures at a point downstream from said respective hot and cold water check valves, said valve plug being movably responsive to the difference between said hot and cold water supply pressures for communicating the lower of said hot and cold water supply pressures to the downstream side of said cold water bypass valve.

\* \* \* \* \*